(12) United States Patent
Collins (10) Patent No.: US 6,697,953 B1
(45) Date of Patent: Feb. 24, 2004

(54) METHOD FOR REDUCING POWER CONSUMPTION IN BATTERY POWERED DEVICES

(75) Inventor: William Harry Collins, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 650 days.

(21) Appl. No.: 09/713,505

(22) Filed: Nov. 15, 2000

(51) Int. Cl.[7] ................................................. G06F 1/32
(52) U.S. Cl. ....................................................... 713/320
(58) Field of Search .................................. 713/320, 322

(56) References Cited

U.S. PATENT DOCUMENTS

| | | |
|---|---|---|
| 5,532,935 A | 7/1996 | Ninomiya |
| 5,541,489 A | 7/1996 | Dunstan |
| 5,790,875 A | 8/1998 | Andersin |
| 5,915,120 A | 6/1999 | Wada |

*Primary Examiner*—Thomas M. Heckler
(74) *Attorney, Agent, or Firm*—Myers Bigel Sibley & Sajovec (57) ABSTRACT

Disclosed is a method for dynamically invoking power saving options in a battery powered device, such as a cellular telephone, so that the period of use or run-time of the device is extended. The user settable power saving options alter operation of the device in a way that reduces power consumption and extends run-time. The power saving options define the ways by which power is saved, such as less intensity for a backlight or slower scanning for a wireless accessory, and when they are invoked, based in part on a determination of the estimated or measured actual capacity in the battery. For example when a battery is at full capacity, all features may be fully operable and as the battery discharges some of the features may be disabled or work with reduced performance.

30 Claims, 6 Drawing Sheets

Figure 1

Battery Powered Communicator

Battery Powered Communicator

| Battery Capacity Threshold (%) | Features Defined for a Power Saving Option |
|---|---|
| 90 % | No change |
| 80 % | No change |
| 70 % | Reduce search frequency for local IR and RF communications |
| 60 % | Reduce back-light intensity |
| 50 % | Reduce back-light auto-on time |
| 40 % | Reduce search frequency for local IR and RF communications again |
| 30 % | Reduce transmit power level for local IR and RF communications |
| 20 % | Disable local IR and RF communications |

Figure 4

Laptop Computer

| Battery Capacity Threshold (%) | Features Defined for a Power Saving Option |
|---|---|
| 90 % | No change |
| 80 % | No change |
| 70 % | Power down hard drive after not accessed for predetermined time |
| 60 % | Dim the display back-light |
| 50 % | Decrease the predetermined time before power down of hard drive |
| 40 % | Dim the display and back-light |
| 30 % | Disable input/output ports |
| 20 % | Turn the display back-light off |

Figure 5

Battery Powered Device

| Battery Capacity Threshold (%) | Features Defined for a Second Power Saving Option |
|---|---|
| 50 % | Reduce back-light auto-on time |
| 30 % | Reduce back-light intensity |
| 10 % | Disable back-light |

Figure 6

METHOD FOR REDUCING POWER CONSUMPTION IN BATTERY POWERED DEVICES

BACKGROUND OF THE INVENTION

The present invention relates generally to a method for adjusting the power consumption of a battery powered device, and more particularly, to a method for modifying the operation of a battery powered device to reduce the power consumption of the device as the capacity remaining in the battery decreases, and to increase the power consumption of the device as the capacity in the battery increases.

It will be understood that the extension of battery life for battery powered devices is a significant consideration in the design and development of these devices. Moreover, considerable emphasis is placed on reducing the size of such battery powered devices. As battery powered devices become smaller the maximum size of the battery powering such devices becomes smaller, and for a given battery technology, the smaller the battery the smaller its capacity. There is, therefore, a continuing need to decrease the power consumption of battery powered devices to enable the use of smaller size, and therefore, smaller capacity batteries. Additionally there is a need to continually increase the time that battery powered devices can operate on a set of batteries, before replacement or recharging is needed, in order to increase their utility and acceptance in the market.

In the field of battery powered devices, various methods of reducing power consumption, to address the problem of limited battery operation time, are known. For laptop computers, power management algorithms have been devised to indicate the estimated time remaining before the battery is fully discharged. Algorithms that increase operation time by changing power consumption so that a defined run time is reached are also known. Additionally, algorithms that change the amount of time that power consuming peripherals remain powered up are known.

These various algorithms fail to provide a way to reduce power consumption automatically, without actions by the user, and particularly, to provide increased power reduction as the battery becomes more discharged. These known configurations also fail to provide a dynamic way of reducing power consumption and instead provide predetermined power savings that either compromise operation of the device all of the time or require that the user manually select how and when to implement power savings. These known methods do not address the issue of allowing dynamic and automatic adjustment of power consumption based on the actual battery capacity remaining in the battery.

SUMMARY OF THE INVENTION

According to the present invention, a battery powered apparatus is provided which automatically adjusts power consumption of the apparatus based on features or options. A feature may be a setting or control for any part of the apparatus that requires power from the battery. A battery capacity threshold may be associated with each feature for determining at what actual battery capacity the feature produces a change in battery power consumption. A battery capacity threshold may also be defined as the capacity threshold of an energy source besides a battery. An option may be a predefined set of features and associated battery capacity thresholds for changing the power consumption of the battery powered device as the actual battery capacity changes. One user selectable option may cause the power consumption of the battery powered device to be automatically reduced, by reducing the power consumption of a feature, as the battery capacity decreases due to discharge of the battery. The power consumption may also automatically increase, by increasing the power consumption of the feature, as the battery capacity increases.

According to a preferred embodiment of the present invention, a method for reducing power consumption in a battery powered device is provided, comprising: determining a battery capacity, determining a feature and an associated battery capacity threshold, and adjusting operation of the feature based on the relationship between the battery capacity threshold and the battery capacity.

In another embodiment of the present invention, a method for reducing power consumption in a battery powered device is provided, comprising: determining a battery capacity, determining a feature and an associated battery capacity threshold, determining operation of the feature based on the relationship between the battery capacity threshold and the battery capacity, and providing an audible or visible indication of the determined operation of the battery powered device.

DETAILED DESCRIPTION OF THE INVENTION

The present invention is an apparatus and method for automatically reducing power consumption in a battery powered device. A battery powered device may include, but is not limited to, a cellular phone, a two way radio, a walkie-talkie, a satellite phone, a computer, a game, a cordless phone, a PDA, an organizer, a calculator, a remote control, and other similar devices. It is to be understood that this invention may include other energy sources, that may be used in place of batteries, such as fuel cells, super capacitors, generators, or mechanical energy storage devices such as flywheels.

Figure 1:
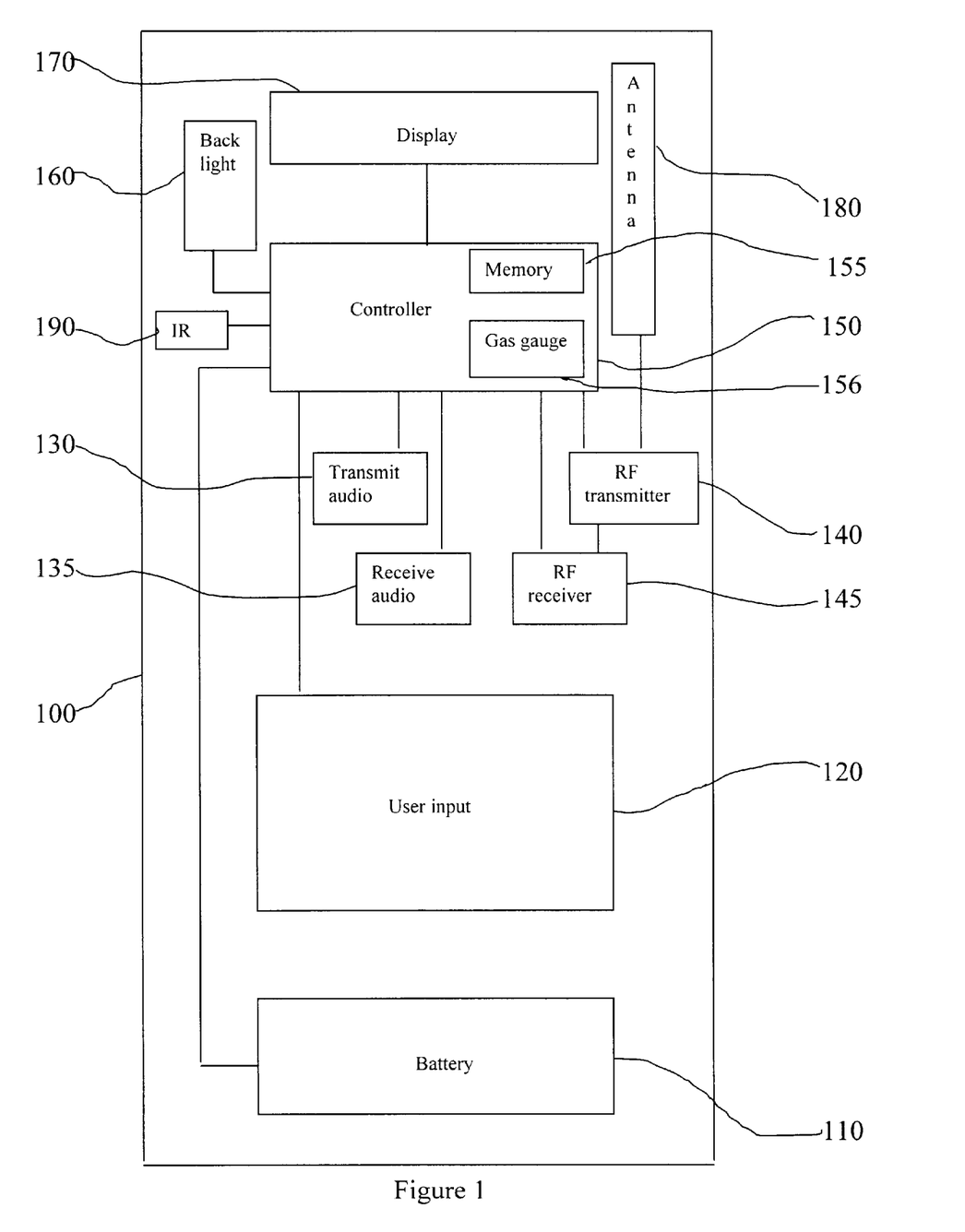
FIG. 1 is a drawing showing a block diagram of a preferred embodiment of a battery powered communicator of the invention.

Referring now to the apparatus of FIG. 1, a battery powered communicator 100 is shown in accordance with a preferred embodiment of the present invention. The battery powered communicator 100 may include a battery 110 for powering the communicator and a controller 150. The controller 150 may include a gas gauge 156 and a memory 155 such as an EEPROM for storing predefined and user set data, and may control a display 170, a backlight 160, an infrared receiver/transmitter 190, an RF transmitter 140, an RF receiver 145, an audio transmitter 130 such as a microphone, and an audio receiver 135 such as a speaker. An antenna 180 may be coupled to RF transmitter 140 and RF receiver 145 for receiving and transmitting radio frequency energy. The controller 150 may use the gas gauge 156 to measure the energy removed from the battery 110 for determining the battery capacity. A user input 120 may be coupled to controller 150 and may provide for user entry for control of the communicator 150 including selection of an option for power reduction and for storing the selected option in memory 155. The controller 150 may use the selected option to determine operation of the battery powered communicator 100 by controlling the display 170, the backlight 160, the IR receiver/transmitter 190, the receiver 145, the receive audio 135, the transmitter 140, the transmit audio 130, and the antenna 180, so as to determine the power draw from the battery 110.

Figure 2:
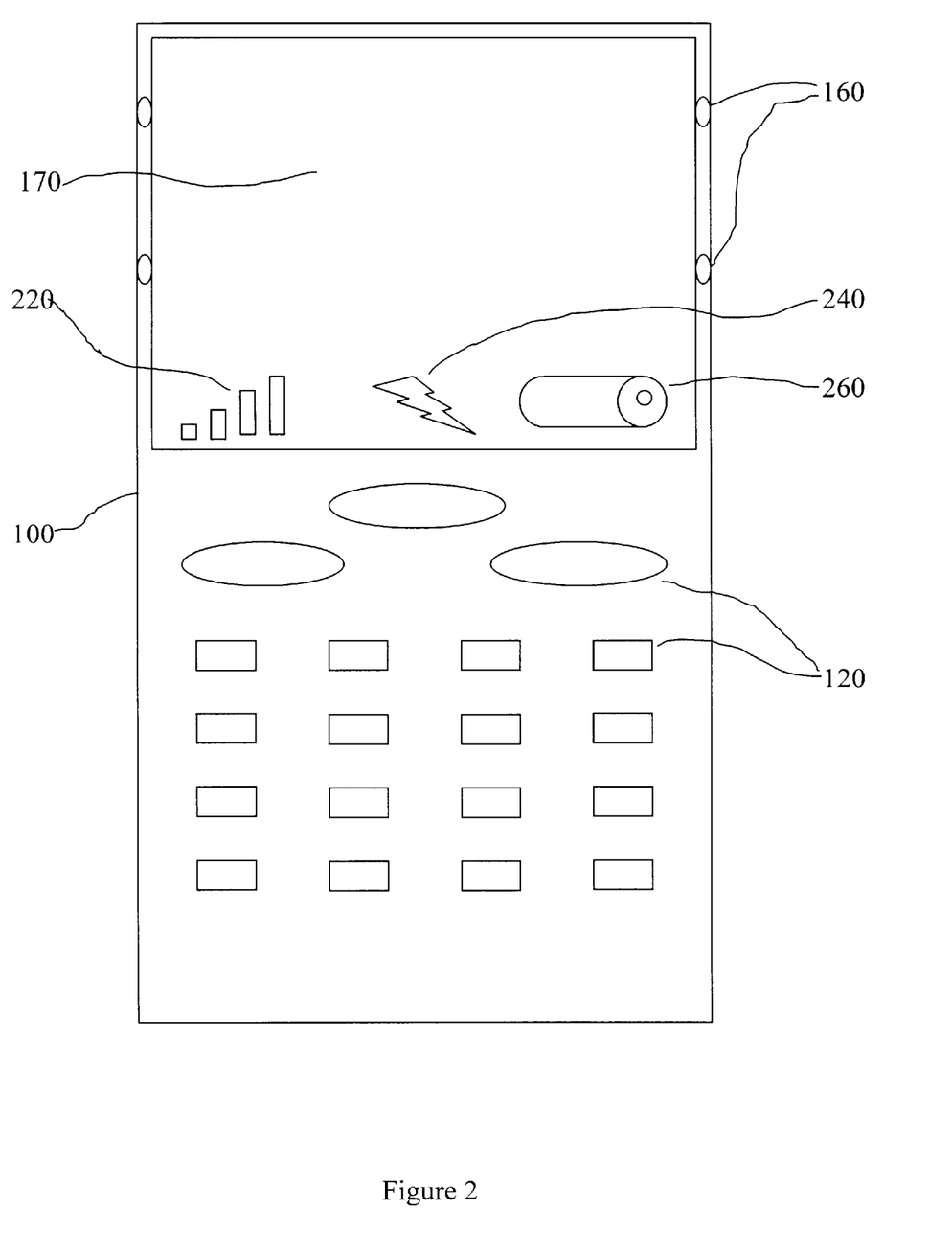
FIG. 2 is a drawing showing one battery powered communicator of the invention with visual indicators.

Referring now to FIG. 2, a battery powered communicator 100 is shown in an embodiment of the present invention. The battery powered communicator 100 may include a user input 120 such as a keyboard, a backlight 160, a display 170, a bar graph indicator 220, a feature icon indicator 240, and a battery icon indicator 260. The battery powered communicator 100 of FIG. 2 may also contain the elements shown in FIG. 1. The bar graph indicator 220, the feature icon indicator 240, and the battery icon indicator 260 may be used by controller 150 to provide a visual indication of the selected option, or features associated with the selected option, for communicator 100. The bar graph indicator 220 may show the selected option by the elements lit in the bar graph 220. The feature indicator icon 240 may show that a particular option, or feature of an option, is invoked. The battery icon indicator 260 may show the battery capacity as a percent of the maximum battery capacity. The battery icon indicator 260 may also flash to indicate that power saving options are invoked and stop flashing when the power saving options are stopped. Text or other messages in the display 170 may indicate the option selected for battery power savings and may also indicate the features defined for the selected option and may change as the features are activated or deactivated due to discharge or charge, respectively, of the battery 110.

The battery powered communicator 100 may include all of the parts of a conventional cellular telephone and may have predefined options for power reduction preprogrammed in memory 155 from the factory. Each predefined option may provide for at least one feature and one battery capacity threshold. An option may be a set of features with a corresponding battery capacity threshold for each feature. The features may be specific functions that affect power consumption, such as the power level of an RF transmitter 140. The battery capacity thresholds may be the levels of battery capacity at which each feature is to be invoked, thereby altering the power consumption of the communicator 100. The options, and the option currently selected, may be stored in memory 155. The option selected may be changeable by user input 120 and stored in memory 155. The features and corresponding battery capacity thresholds may also be stored in memory 155 of communicator 100 and may be programmable by user input 120. The features and options selectable by the user and preprogrammed at the factory may themselves be changeable by the user for customization so that, for example, different battery capacity thresholds may be set by the user. The features and battery capacity thresholds used for programming an option may thus be programmable by way of user input 120 along with the addition or deletion of options themselves.

One, none, or multiple options may be selected by user input 120. For example, there may be three programmed options that include a total of 10 features and one of 5 battery capacity thresholds for each feature. The first option may include features 1–5, corresponding to battery capacity thresholds 1–5, respectively. A user may reprogram this first option to include features 1–5 corresponding to battery capacity thresholds 3–7, respectively. The second option may include features 1–7 and a user may reprogram this option to include features 1–9. The third option may include features 1–10 and battery capacity threshold 6. If the second option is currently selected for operation, the user may change the selection of option to the third option either for operation or for reprogramming of the option. Moreover, it is intended that all of the features may be individually defined and operable without being defined as an option set.

Figure 4:
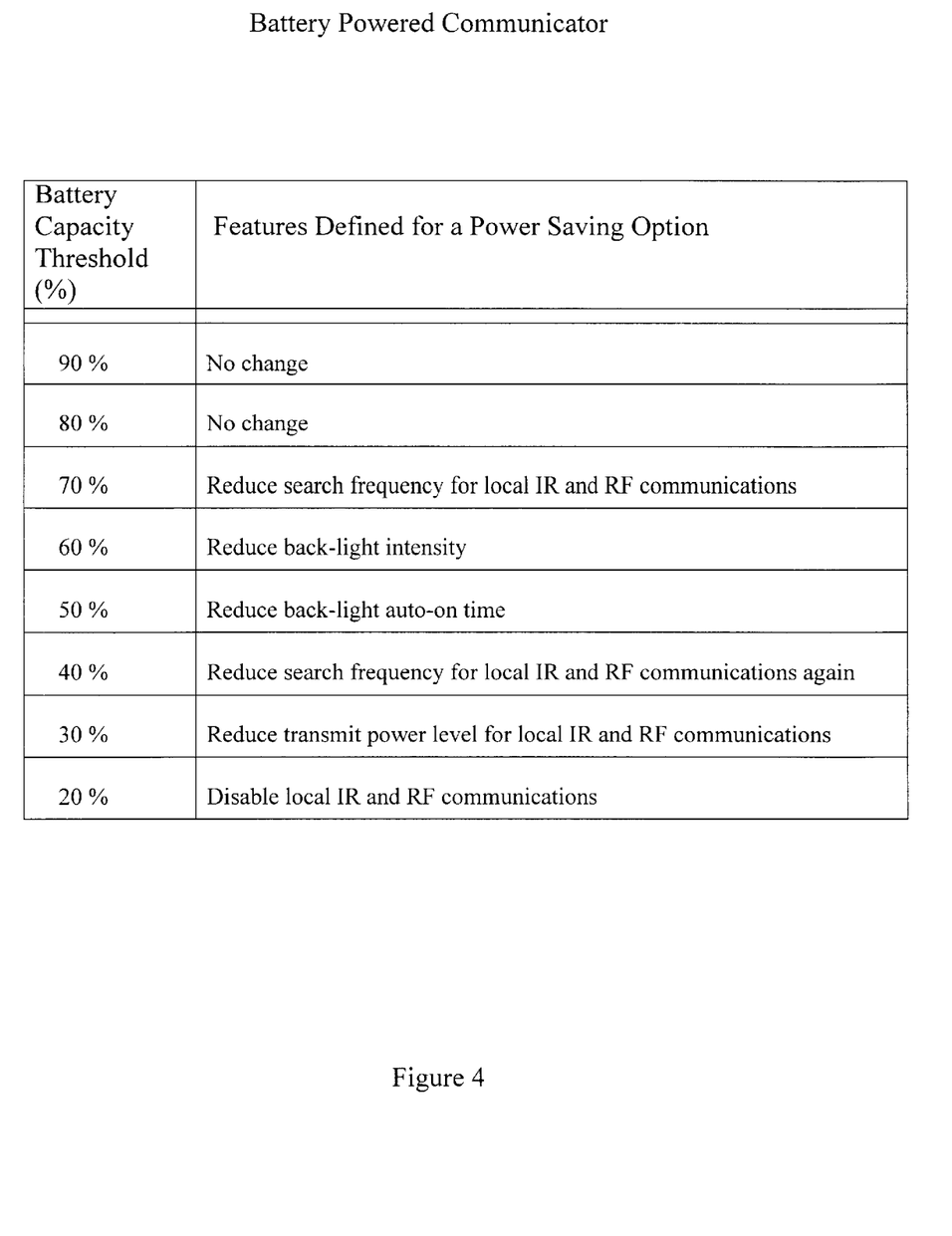
FIG. 4 is a table showing a power saving option for a battery powered communicator of the invention.

Referring now to FIG. 4, an example of a power saving option is defined, providing a set of six power saving features and six corresponding battery capacity thresholds. This data is stored in memory 155 and may be initiated by the user as previously defined. In this figure, no features are defined for battery capacity thresholds of 80% and 90%. Thus, as the battery capacity passes the thresholds of 90% and 80% there is no change in operation due to the option. The feature "Reduce search frequency for local IR and RF communications" is associated with a battery capacity threshold of 70%. Likewise the feature "Reduce back-light intensity" is associated with a battery capacity threshold of 60%, the feature "Reduce back-light auto-on time" is associated with a battery capacity threshold of 50%, the feature "Reduce search frequency for local IR and RF communications again" is associated with a battery capacity threshold of 40%, the feature "Reduce transmit power level for local IR and RF communications" is associated with a battery capacity threshold of 30%, and the feature "Disable local IR and RF communications" is associated with a battery capacity threshold of 20%.

Figure 6:
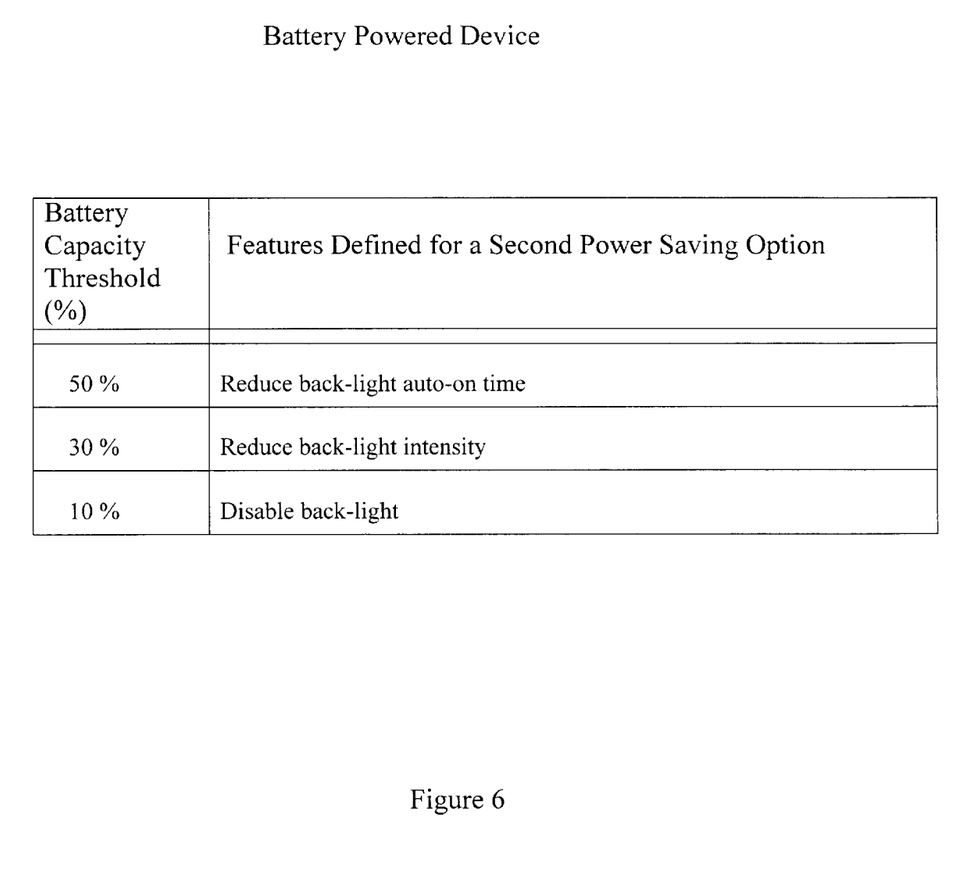
FIG. 6 is a table showing a power saving option for a battery powered device of the invention.

In FIG. 6, another power saving option is defined, providing a set of three power saving features and three corresponding battery capacity thresholds, for a battery powered device capable of controlling a backlight. The feature "Reduce back-light auto-on time" is associated with a battery capacity threshold of 50%. Likewise, the feature "Reduce back-light intensity" is associated with a battery capacity threshold of 30%, and the feature "Disable back-light" is associated with a battery capacity threshold of 10%.

In operation, either the option of FIG. 4 or the option of FIG. 6 may be selected by default, or by the user by way of user input 120, and stored in memory 155. If the option of FIG. 6 is selected, the features of FIG. 6 will be used, and if the option of FIG. 4 is selected, the features of FIG. 4 will be used. For example, if the option of FIG. 6 is selected by controller 150, then the controller 150 may determine the capacity of battery 110 by way of the gas gauge 156, which battery capacity may be defined as equal to the actual battery capacity multiplied by 100 and divided by the maximum battery capacity. Alternatively, the battery capacity and battery capacity threshold may be absolute values of capacity such as milliampere hours, or they may be indicative of the voltage of the battery. If the battery capacity determined by controller 150 is less than the battery capacity threshold of 50%, then the feature "Reduce back-light auto-on time" may be invoked by controller 150. If the battery capacity is less than the battery capacity threshold of 30%, then the features "Reduce back-light intensity" and "Reduce back-light auto-on time" may be invoked by controller 150 and if the battery capacity is less than the battery capacity threshold of 10%, the features "Disable back-light", "Reduce back-light intensity", and "Reduce backlight auto-on time" may be invoked by controller 150. Likewise, if the battery capacity is greater than the battery capacity threshold of 50%, then the features "Reduce back-light auto-on time", "Reduce back-light intensity", and "Disable back-light" may be revoked by controller 150. If the battery capacity is greater than the battery capacity threshold of 30%, then the features "Reduce back-light intensity" and "Disable back-light" may be revoked by controller 150. If the battery capacity is greater than the battery capacity threshold of 10%, then the feature "Disable back-light" may be revoked by controller 150. Likewise, if the option of FIG. 4 is selected, operation would be in like manner to FIG. 6. If the option is changed by the user, then all features of the prior option would be revoked, and features of the newly selected option implemented, as determined by the controller 150.

Figure 5:
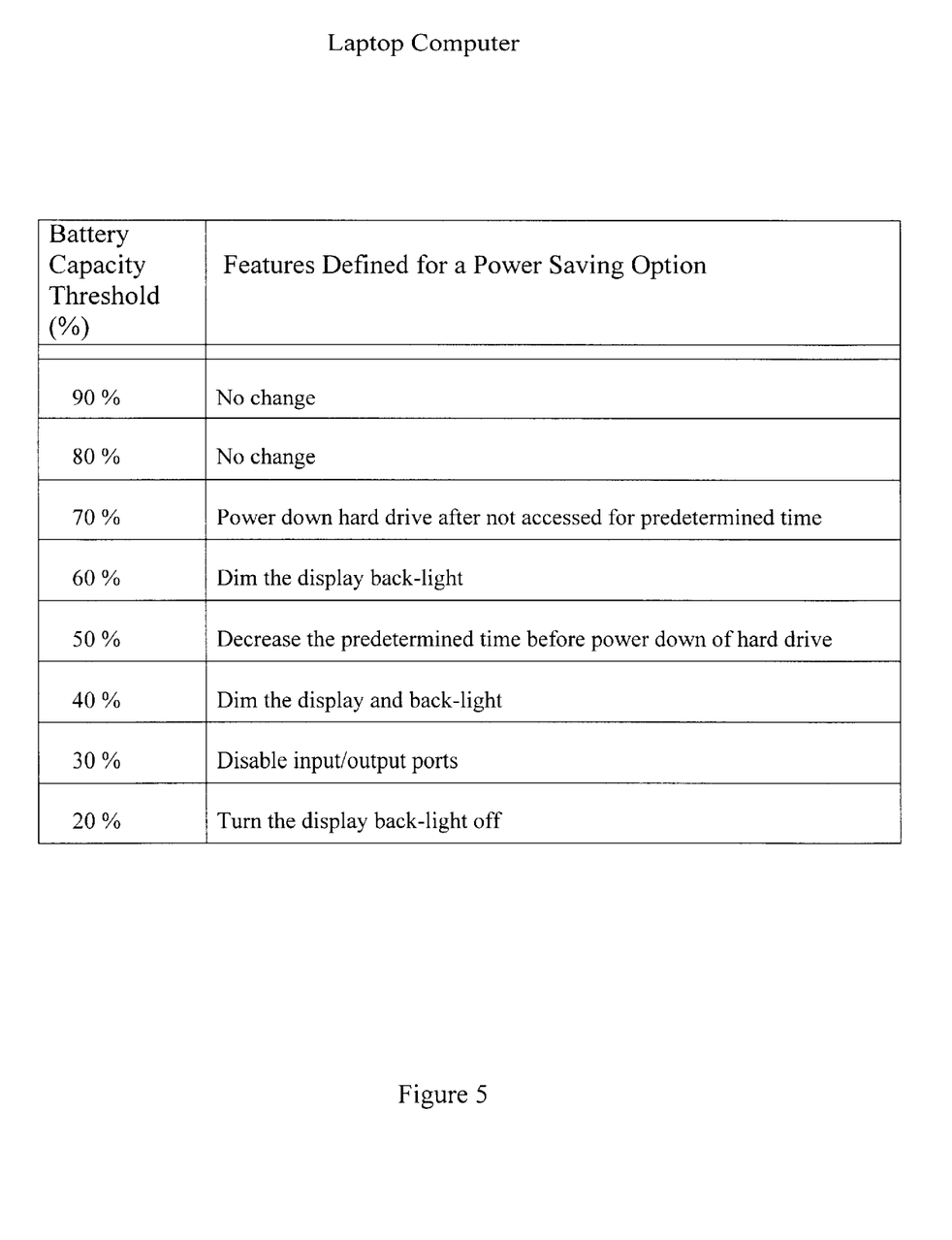
FIG. 5 is a table showing a power saving option for a laptop computer of the invention.

Referring now to FIG. 5, a power saving option is defined for a laptop computer. It is to be understood that the present invention may be applicable to any battery powered device with a controller and thus an option for a laptop computer is provided with a set of six power saving features and six corresponding battery capacity thresholds. In this figure, no features are defined for battery capacity thresholds of 80% and 90%. The invocation and revocation of features for this option may operate substantially as described for FIG. 4 and FIG. 6. The feature "Power down hard drive after not accessed for predetermined time" is associated with a battery capacity threshold of 70%. Likewise the feature "Dim the display back-light" is associated with a battery capacity threshold of 60%, the feature "Decrease the predetermined time before power down of hard drive" is associated with a battery capacity threshold of 50%, the feature "Dim the display and back-light" is associated with a battery capacity threshold of 40%, the feature "Disable input/output ports" is associated with a battery capacity threshold of 30%, and the feature "Turn the display back-light off" is associated with a battery capacity threshold of 20%. In operation, if the battery powering the laptop computer is discharged so that the battery capacity decreases below the threshold of 30%, then the feature "Disable input/output ports" is invoked by the laptop computer.

It will be understood that features may include any function or operation under the control of controller 155 that affects the power draw of the battery of the battery powered device. Thus, features are not limited to those identified in FIG. 4, FIG. 5, and FIG. 6 and may include the clock speed of the controller, the frequency of any operation, the intensity or duration of any operation, or the selection of any operation. Features may, additionally, be programmed in memory 155 independent of options and may be invoked or revoked for operation on the basis of individual or multiple selection by user input 120.

Figure 3:
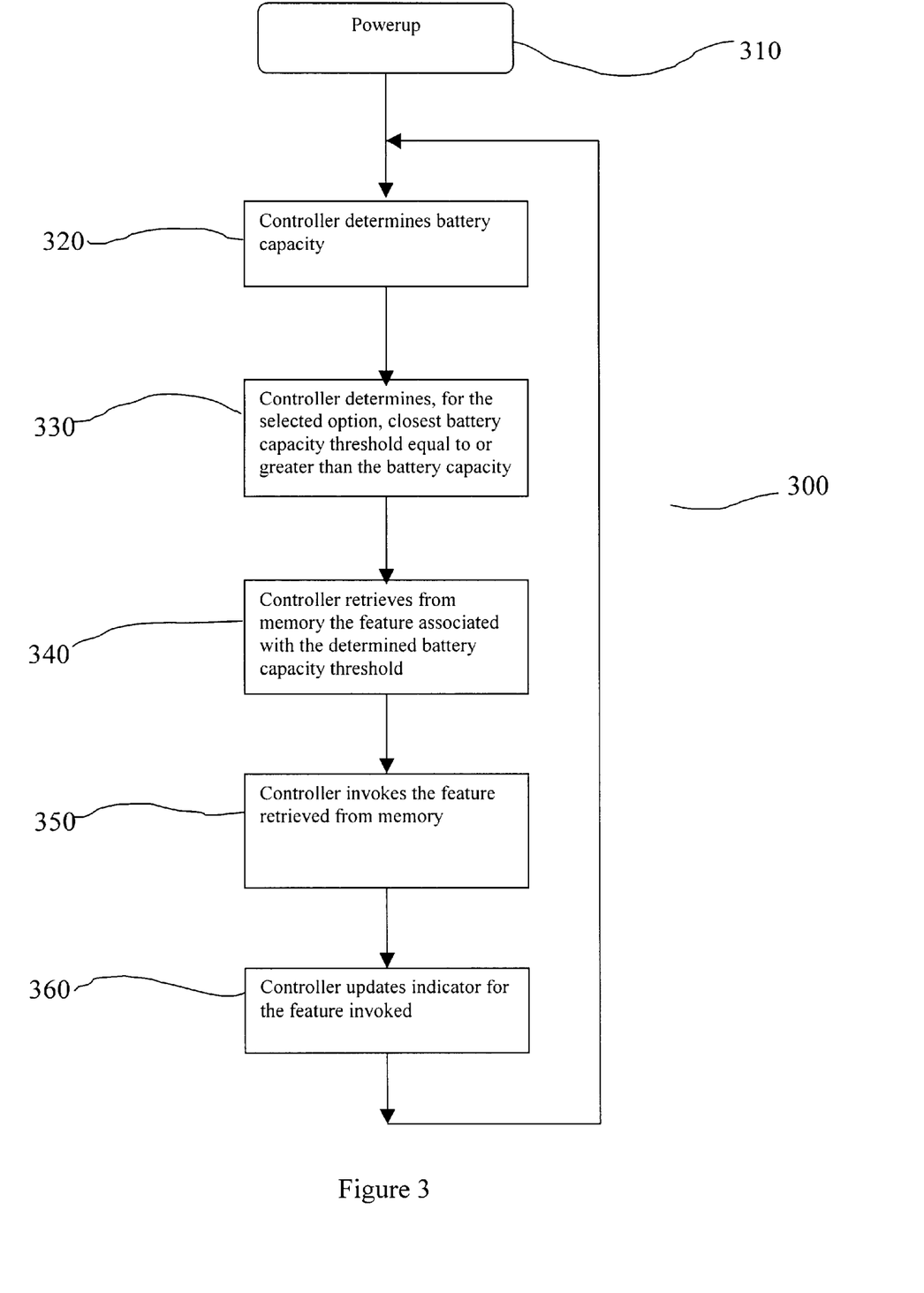
FIG. 3 is a flowchart showing an embodiment of an algorithm of the present invention.

FIG. 3 shows a flowchart 300 of an algorithm for operation of the invention. By way of example, the communicator 100 shown in FIG. 1 and FIG. 2 and the features shown in FIG. 4 will be used in describing the algorithm of FIG. 3. The communicator 100 may retain in memory 155 a feature, an option, a selection of a feature and/or an option, and an indication for selection of the feature and/or option. The user programming or selection of a feature or option may be facilitated through the user input 120 by numerous ways known in the art, such as direct on/off selection of a feature or option, selection from a menu of an option or a feature, or invocation of a function or mode that selects a feature or an option.

The algorithm may start in block 310 with a user powering up the communicator 100 by entering the powerup key by way of the user input 120. At powerup of the communicator 100, the controller 150 may determine the features or options selected by way of the memory 155. If there is no option or feature selected, whether by default or by user input, then the algorithm may proceed without invoking any power saving operations. If a feature or option is selected, as will be shown by example, then the algorithm may proceed to invoke a power saving feature. Next, the algorithm may proceed to block 320 in which the controller 150 determines the battery capacity. The controller 150 and the gas gauge 156 may determine the actual battery capacity by estimation, calculation, measurement, or by communication with the battery as is known in the art. The actual battery capacity may be indicative of the state of charge of the battery 110, decreasing as the battery 110 is discharged and increasing as the battery 110 is charged. Maximum battery capacity may be determined from the battery capacity provided by the battery 110 through a discharge cycle, indicative of the capacity difference between a charged and a discharged state of the battery 110. Alternatively, the maximum battery capacity may be a predetermined value, indicative of the milliampere hour rating of the battery 110, receivable from the memory 155 or the battery 110. The value for battery capacity may be calculated as the actual battery capacity divided by the maximum battery capacity and multiplied by 100. The means for gas gauge 156 to determine the battery capacity may include Coulomb counting by the controller 150, conventional battery gas gauge functions, or measuring voltage with a lookup table for conversion to capacity. After determining this battery capacity, the algorithm proceeds to block 330. In this block, if the battery capacity is determined to be 48%, for example, then the controller 150 retrieves from memory 155, as shown in FIG. 4, the battery capacity threshold equal to or greater than the battery capacity of 48%, which is the battery capacity threshold of 50%. The controller 150 may also retrieve from memory 155, as shown in FIG. 4, all of the battery capacity thresholds equal greater than the battery capacity of 48%, i.e., 50%, 60%, 70%, 80%, and 90%. Then the algorithm proceeds to block 340, in which the controller 150 reads from memory 155 the feature associated with the battery capacity threshold of 50%, which is "Reduce back-light auto-on time" and may also read from memory 155 the features associated with battery capacity thresholds of 60%, 70%, 80%, and 90%. Next, the algorithm proceeds to block 350 in which the controller 150 invokes the feature or features identified in block 340. In this example, the auto-on time that the backlight is on, after a user input 120, may be reduced by a predetermined time which may be, for example, from 30 seconds to 10 seconds. The predetermined time may be inherent in the feature or in the algorithm. The backlight intensity and search frequency for local IR and RF communications may also be reduced by predetermined values. The algorithm then proceeds to block 360 in which controller 150 may change the number of bars indicated in the bar graph indicator 220 to indicate the battery capacity threshold reached by the battery capacity. The algorithm then returns to block 320 and repeats.

It is to be understood that the features described herein are representative of possible features usable for power savings. There are also a large variety of features possible just by changing intensities, powers, times, and frequencies. Likewise, the battery capacity thresholds may cover the full range of battery capacity and may be grouped at any position in the range of capacity.

Thus, there has been shown and described a method and apparatus for providing an improved battery life for a battery powered communicator, or a laptop computer, which fulfills all the objects and advantages sought therefore. Many changes, modifications, variations and other uses and applications of the subject invention will, however, become apparent to those skilled in the art after considering this specification and the accompanying drawings which disclose a preferred embodiment thereof. All such changes, modifications, variations and other uses and applications which do not depart from the spirit and scope of the invention are deemed to be covered by the invention which is limited only by the claims which follow.

What is claimed is:

1. A method for reducing power consumption in a battery powered device, comprising:

determining a battery capacity;

determining a feature and a battery capacity threshold; and adjusting operation of the device based on the feature, the battery capacity threshold, and the battery capacity.

2. A method for reducing power consumption in a battery powered device according to claim 1, further comprising: providing an indication of the feature.

3. A method for reducing power consumption in a battery powered device according to claim 1, wherein the battery powered device is a cellular telephone.

4. A method for reducing power consumption in a battery powered device according to claim 1, wherein the battery powered device is a cordless telephone.

5. A method for reducing power consumption in a battery powered device according to claim 1, wherein the feature comprises reducing the frequency of a function.

6. A method for reducing power consumption in a battery powered device according to claim 5, wherein reducing the frequency of a function comprises reducing the frequency of turning on an RF receiver.

7. A method for reducing power consumption in a battery powered device according to claim 1, wherein the feature comprises reducing the power of a function.

8. A method for reducing power consumption in a battery powered device according to claim 7, wherein reducing the power of a function comprises reducing the power of a transmitter.

9. A method for reducing power consumption in a battery powered device according to claim 1, wherein the feature comprises turning off a function.

10. A method for reducing power consumption in a battery powered device according to claim 9, wherein turning off a function comprises turning off a keypad backlight.

11. A method for reducing power consumption in a battery powered device according to claim 9, wherein turning off a function comprises turning off a display backlight.

12. A method for reducing power consumption in a battery powered device according to claim 1, wherein the feature comprises turning on a function.

13. A method for reducing power consumption in a battery powered device according to claim 12, wherein turning on a function comprises reducing the brightness of a display backlight.

14. A method of operation of a cellular telephone, comprising:

determining a battery capacity;

retrieving from a memory, a battery capacity threshold and a feature associated with the battery capacity threshold;

comparing the battery capacity threshold with the battery capacity; and enabling the feature if the battery capacity threshold is greater than the battery capacity.

15. A method of operation of a cellular telephone, comprising:

determining a battery capacity;

retrieving from a memory, a battery capacity threshold and a feature associated with the battery capacity threshold;

comparing the battery capacity threshold with the battery capacity; and enabling the feature if the battery capacity threshold is greater than the battery capacity and disabling the feature if the battery capacity threshold is not greater than the battery capacity.

16. A method of operation of a cellular telephone, comprising:

determining a battery capacity of a battery powering the cellular telephone;

retrieving from a memory an option, said option comprising a battery capacity threshold and a feature associated with the battery capacity threshold;

comparing the battery capacity threshold with the battery capacity; and enabling the feature if the battery capacity threshold is greater than the battery capacity and disabling the feature if the battery capacity threshold is not greater than the battery capacity.

17. A method of operation of a cellular telephone according to claim 16, further comprising selecting the option to be retrieved from the memory.

18. A method of operation of a cellular telephone according to claim 16, further comprising:

retrieving from the memory a second battery capacity threshold and a second feature associated with the second battery capacity threshold;

comparing the second battery capacity threshold with the battery capacity; and enabling the second feature if the second battery capacity threshold is greater than the battery capacity and disabling the second feature if the second battery capacity threshold is not greater than the battery capacity.

19. A device powered by an energy source, comprising:

means for determining a capacity of an energy source;

means for determining a feature, and a capacity threshold of the energy source; and means for adjusting operation of the device based on the feature, the capacity threshold of the energy source, and the capacity of the energy source.

20. A device powered by an energy source according to claim 19, wherein the means for adjusting operation of the device comprises changing the power consumption of the device.

21. A device powered by an energy source according to claim 20, wherein changing the power consumption of the device comprises turning off a keypad backlight.

22. A device powered by an energy source according to claim 20, wherein changing the power consumption of the device comprises turning on a keypad backlight.

23. A battery powered device, comprising:

a battery for powering the device;

a feature and an associated battery capacity threshold; and a controller for determining a battery capacity of the battery and for adjusting the power consumption of the device based on the battery capacity, the feature, and the battery capacity threshold.

24. A battery powered device according to claim 23, wherein adjusting the power consumption of the device comprises turning on a display backlight.

25. A battery powered device according to claim 23, wherein adjusting the power consumption of the device comprises turning off a display backlight.

26. A battery powered device, comprising:

a controller;

a memory, readable by the controller, for storing a battery capacity threshold;

a battery for powering the device;

means for measuring an actual capacity of the battery; and means for adjusting power consumption of the device as a function of the battery capacity threshold and the actual capacity of the battery.

27. A battery powered device according to claim 26, wherein adjusting the power consumption of the device comprises adjusting an intensity of a display backlight.

28. A cellular telephone, comprising:

a controller;

a radio frequency transmitter with adjustable transmit power;

a memory, readable by the controller, for storing a battery capacity threshold;

a battery powering the cellular telephone;

means for measuring an actual capacity of the battery; and means for adjusting the transmit power of the cellular telephone as a function of the battery capacity threshold and the actual capacity of the battery.

29. A cellular telephone according to claim 28, wherein the battery capacity threshold is a value of battery voltage and the actual capacity of the battery is a measured value of the voltage of the battery.

30. A cellular telephone according to claim 28, wherein the actual capacity of the battery is determined by a battery gas gauge.

* * * * *